United States Patent [19]

Drabowitch et al.

[11] Patent Number: 4,968,969

[45] Date of Patent: Nov. 6, 1990

[54] DEVICE AND METHOD FOR DATA TRANSMISSION AND/OR ACQUISITION USING TWO CROSS POLARIZATIONS OF AN ELECTROMAGNETIC WAVE AND MAGNETIC RECORDING DEVICE

[75] Inventors: Serge Drabowitch; Yvon Fouché, both of Chatenay Malabry, France

[73] Assignee: Thomson-CSF, Paris, France

[21] Appl. No.: 478,730

[22] Filed: Feb. 12, 1990

Related U.S. Application Data

[63] Continuation of Ser. No. 138,946, Dec. 29, 1987, abandoned.

[30] Foreign Application Priority Data

Dec. 30, 1986 [FR] France ................ 86 18352

[51] Int. Cl.⁵ .......................... G01S 7/42
[52] U.S. Cl. ..................... 342/188; 342/361
[58] Field of Search ................ 342/188, 361

[56] References Cited

U.S. PATENT DOCUMENTS

| | | | |
|---|---|---|---|
| 3,247,514 | 4/1966 | Hamann et al. | 342/44 |
| 3,430,156 | 2/1969 | Katzin | 342/188 X |
| 3,581,310 | 5/1971 | Buckley | 342/188 X |
| 3,772,689 | 11/1973 | Root, Jr. | 342/188 |
| 3,918,055 | 11/1975 | Shimizu et al. | 342/159 |
| 4,005,425 | 1/1977 | Nagy | 342/174 |
| 4,231,037 | 10/1980 | Long | 342/188 X |
| 4,323,899 | 4/1982 | Barnes et al. | 342/90 |
| 4,329,687 | 5/1982 | Kloevekorn et al. | 342/64 |
| 4,490,719 | 12/1984 | Botwin et al. | 342/361 |
| 4,660,045 | 4/1987 | Clark | 342/361 |
| 4,689,622 | 8/1987 | Kuhrdt | 342/14 |
| 4,713,666 | 12/1987 | Poux | 342/152 |
| 4,757,319 | 7/1988 | Lankl | 342/378 |
| 4,766,435 | 8/1988 | Wells | 342/82 |
| 4,811,020 | 3/1989 | Montheil | 342/159 |
| 4,811,021 | 3/1989 | Yoshimoto et al. | 342/361 |
| 4,901,369 | 2/1990 | Momose et al. | 342/361 X |

Primary Examiner—Thomas H. Tarcza
Assistant Examiner—John B. Sotomayor
Attorney, Agent, or Firm—Oblon, Spivak, McClelland, Maier & Neustadt

[57] ABSTRACT

A data transmission and/or acquisition device and method are disclosed. The said device and method use two cross polarizations of an electromagnetic wave and a magnetic recording device. The invention pertains to phase/amplitude modulation using two phase-modulated signals transmitted on two orthogonal polarizations. At reception, the vector sum of the two signals is added taken. The resultant signal is amplitude-modulated and/or phase-modulated. The invention can be applied especially to television and radio transmitters, radars and telecommunications equipment.

10 Claims, 12 Drawing Sheets

FIG_1

FIG_2

FIG_4

FIG_5

FIG_6

FIG_7

FIG_8

FIG_10

FIG_11

FIG_12

FIG_13

FIG_14

FIG_15

FIG_17

FIG_18

DEVICE AND METHOD FOR DATA TRANSMISSION AND/OR ACQUISITION USING TWO CROSS POLARIZATIONS OF AN ELECTROMAGNETIC WAVE AND MAGNETIC RECORDING DEVICE

This application is a continuation of application Ser. No. 07/138,946, filed on Dec. 29, 1987, now abandoned.

BACKGROUND OF THE INVENTION

FIELD OF THE INVENTION

The main object of the invention is a device and method for data transmission and/or acquisition using two cross polarizations of an electromagnetic wave and a magnetic recording device.

The main object of the invention is a device and method for data transmission and/or acquisition using two cross polarizations of an electromagnetic wave and a magnetic recording device.

SUMMARY OF THE INVENTION

The device of the present invention comprises two transmitters connected to two aerials capable of emitting radiation in two cross polarizations. Each transmitter uses a phase modulation. At reception, the vector sum of the signals emitted by each transmitter is taken. Thus it is possible, for example, to use transmitters in class C operation, namely saturated phase-modulated transmitters, to obtain an amplitude/phase modulation at reception.

The use of class C amplifiers gives excellent energy efficiency as well as excellent phase linearity.

The use of two independent modulations makes it possible either to increase the transmission rate or to reduce the resolution needed for the functioning of the device according to the present invention.

High data transfer rates are made possible by amplitude and phase locking at reception.

The main object of the invention is a device for the transmission of modulated waves, comprising two transmitters, wherein the first transmitter is connected to a first transmission aerial using a first polarization and the second transmitter is connected to a second aerial using a second polarization which is orthogonal with the first polarization.

Another object of the invention is a device for the reception of modulated waves, comprising two aerials that use cross polarizations.

Yet another object of the invention is a device for the magnetic recording of data comprising several magnetic heads, the said device comprising a data-processing device capable of giving each magnetic head the phase values which are to be recorded and which, when recombined at reading, will reconstitute the recorded signal.

BRIEF DESCRIPTION OF THE DRAWINGS

The invention will be better understood from the following description of the appended figures given as non-exhaustive examples, of which.

DESCRIPTION OF PREFERRED EMBODIMENTS

FIGS. 1 to 18 use the same references to designate the same elements.

Figure 1:
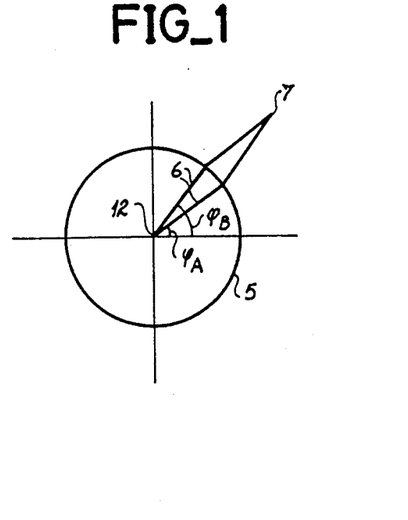
FIG. 1 is a diagram illustrating the operating principle of the device according to the present invention.

FIG. 1 illustrates the working principle of the device according to the present invention. FIG. 1 illustrates an example of the use of two transmitters of the same power. In FIG. 1, polar coordinates are used represent the signals 6 that may be transmitted by two transmitters. The modulus represents the amplitude of the signal transmitted and the angle represents the phase. The circle 5 represents the amplitude of the transmitters used. A first signal 6 corresponds to a phase $\phi A$, the second signal 6 corresponds to a phase $\phi B$. The resultant signal 7 is obtained at reception by making the vector sum of the signal 6 coming from the two transmitters.

Thus it can be seen that the appropriate modulation of the phases $\phi A$ and $\phi B$ of the two transmitters gives an amplitude-modulated and phase-modulated signal 7.

Advantageously, the method and device according to the present invention is used to obtain digital transmission of data.

Figure 2:
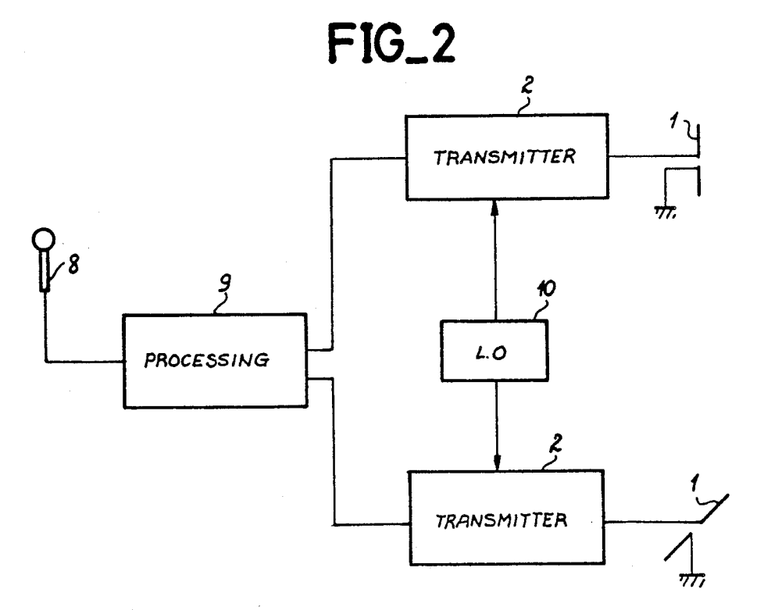
FIG. 2 is a diagram illustrating a first example of a transmitting device according to the present invention.

FIG. 2 shows an example of a transmitting device according to the present invention.

The device has at least one source 8 of signals to be transmitted. This source 8 may be a microphone for example. The signal source 8 is connected to a processing device 9. The processing device 9 converts the signals received into transmitter control signals 2 (or phase modulation devices not shown in FIG. 2) by which it is possible to obtain the phases needed to generate a signal, the said phases depending on the signal to be transmitted. The processing device is connected to at least two transmitters 2.

Advantageously, a local oscillator 10 is connected to the transmitters 2 thus making it possible to increase frequency. It is possible to use several stages (not shown) to increase the frequency.

The transmitters 2 are connected to two transmission aerials 1 working in substantially orthogonal polarizations. The transmission aerials 1 are, for example, monopole or dipole aerials.

Advantageously the monopole or dipole aerials 1 are placed at the focus of a reflector or a Cassegrain aerial. The outputs of the transmitters 2 are connected to two transmission aerials 1, capable of transmitting electromagnetic waves in cross polarizations.

Figure 3:
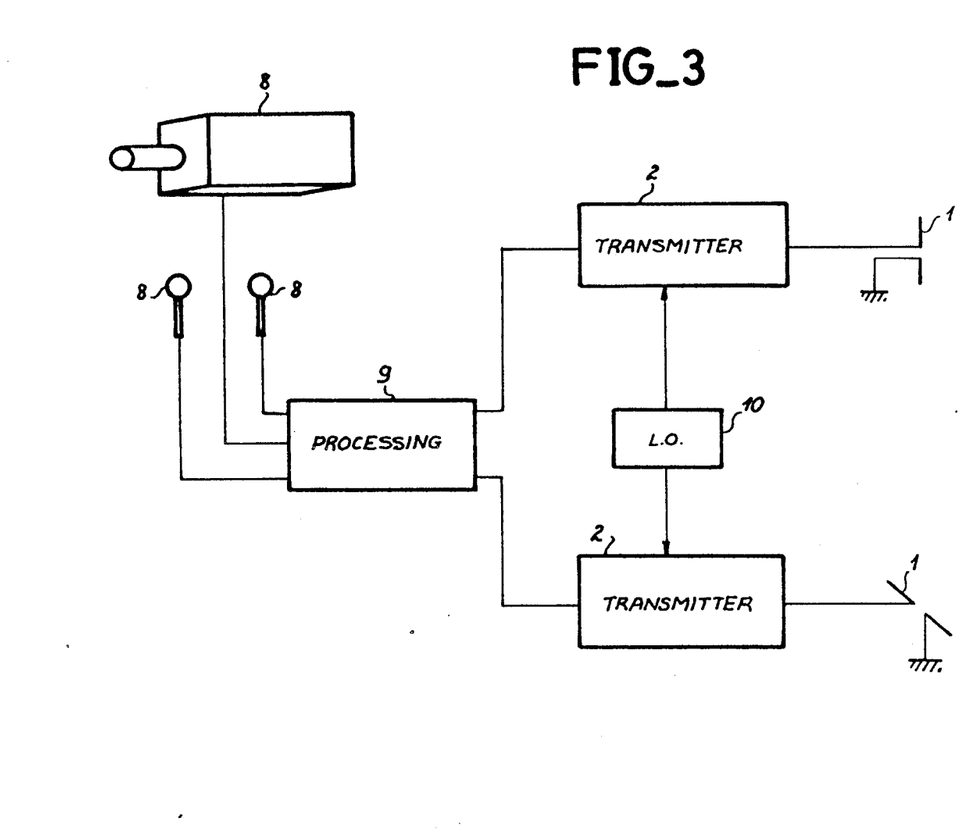
FIG. 3 is a diagram illustrating a second example of a transmitting device according to the present invention.

FIG. 3 shows a television transmitter according to the present invention. In the example shown in FIG. 3, a video camera and two microphones are used as a signal source 8. It is possible to use a control unit which gives, for example, two output channels, a sound channel and a video channel, the input of the control unit comprising, for example, television cameras, microphones, alphanumeric character generators and video cameras. The signal sources 8 are connected to a processing device 9. The processing device 9 is connected to two transmitters 2. Furthermore, a local oscillator 10 is connected to the transmitters 2.

The use of a high transfer rate transmission channel makes it possible to create high-resolution television transmissions. The increase in the channel transmission transfer rate is obtained, for example, through the transmission, by aerials 1, of two independent modulations, thus making it possible to obtain amplitude modulation and phase modulation at reception.

Figure 4:
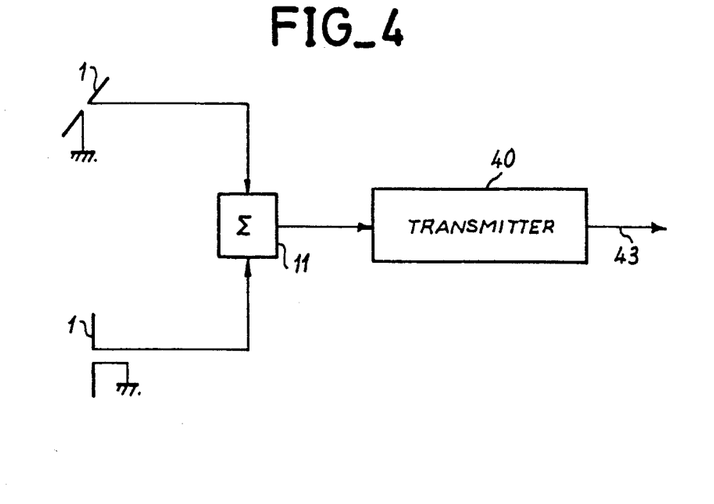
FIG. 4 is the diagram of a first example of a reception device according to the present invention.

FIG. 4 shows an example of a reception device according to the present invention. The device has two aerials 1 capable of receiving electromagnetic waves in cross polarizations. These two aerials 1 are connected to an adding device 11. The adding device 11 is, for example, a hybrid ring junction or a magic T junction.

For example, two arms of the magic T junction are connected to the aerials 1, one arm is connected to a receiver 40, while the fourth arm is connected, for example, to a matched load. At the output of the receiver 40, we have an amplitude-modulated and phase-modulated signal 43.

Advantageously, the frequencies of the received signal are reduced at reception. The frequency reduction devices are not shown in FIG. 4.

The matched load connected to the adding device 11 absorbs, on an average, half of the energy picked up by the aerials 1. However, this loss of 3 dB is less serious at reception where the power values that come into play are smaller than they would be at transmission.

Figure 5:
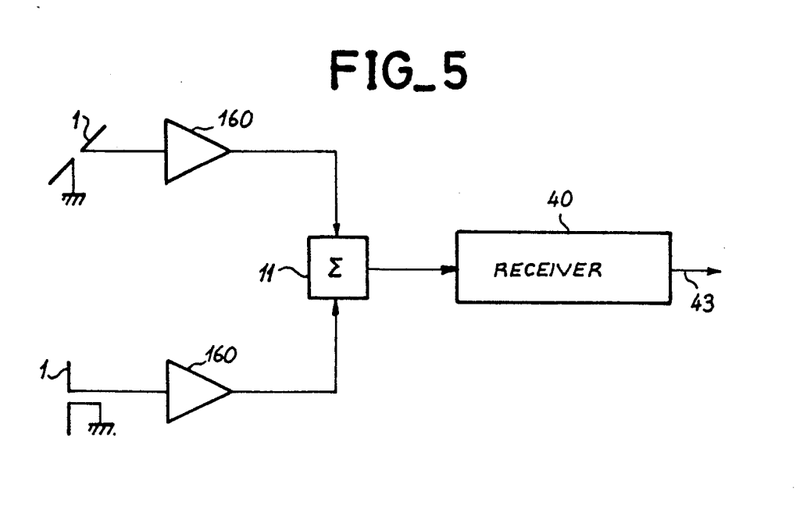
FIG. 5 is the diagram of a second example of a reception device according to the present invention.

FIG. 5 shows an example of a reception device, according to the present invention, which is especially advantageous because it has an excellent signal-to-noise ratio.

The reception device of FIG. 5 has two reception aerials 1 capable of working in cross polarizations, connected by aerial amplifiers 160 to an adding device 11. The adding device 11 is connected to a receiver 40. At the output of the receiver 40, there is an amplitude-modulated and phase-modulated signal 43.

The use of aerial amplifiers 160 gives a signal-to-noise ratio gain of 3 dB. For the signals are combined only after amplification. Thus the energy losses in the adding devices 11, corresponding to the energy absorbed by the matched load, does not diminish the signal-to-noise ratio.

Figure 6:
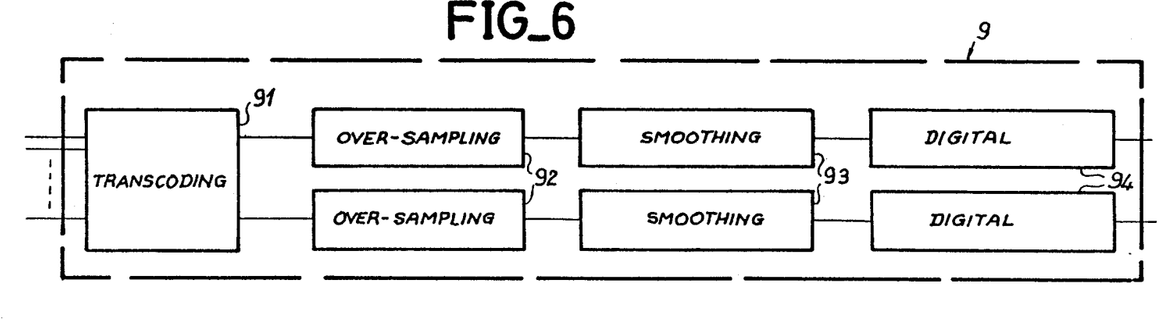
FIG. 6 is a diagram of an example of a detail of the devices of FIGS. 2 and 3.

FIG. 6 shows a processing device 9 used to distribute N signal sources 8 (not shown in FIG. 6) between two transmitters 2 (not shown in FIG. 6), The device 9 has a transcoding device 91. The transcoding device 9 provides the transmitters 2 with the signals needed for transmission. For example, in the case of a single signal source 8 and two transmitters 2, a complex wanted signal is transmitted $x(t)=\rho(t)\cdot e^{j\phi(t)}$ modulated in a single sideband around a frequency of $f_0$.

The signals transmitted e(t) are given by the formula:

$$e(t) = \text{Réel}\,[x(t) \cdot e^{j2\pi f_0 t}]$$

$$e(t) = \rho(t)\,\text{Réel}\,[e^{j(2\pi f_0 t + \phi(t))}]$$

$$e(t) = \rho(t)\cos(2\pi f_0 + \phi(t))$$

Let $\Delta u(t) = \arccos \rho(t)/2$.

Thus we obtain the modulation signals of a first transmitter 2:

$$x_1(t) = e^{j\phi(t) + (t)}$$

and the modulation signal of the second transmitter 2:

$$x_2(t) = e^{j\phi(t) - \Delta\phi(t)}$$

The signals $x_1$ and $x_2$ are transmitted by two aerials 1 working in cross polarization.

At reception, at the output of the adding device 11 of FIGS. 4 and 5, a signal is obtained $$e'(t) = \text{Réel}[x_1(t) \cdot e^{j2\pi f_0 t}] + \text{Réel}[x_2(t) \cdot e^{j2\pi f_0 t}]$$

$$e'(t) = \text{Réel}[[(x_1(t) + x_2(t)]\,e^{j2\pi f_0 t}]$$

$$e'(t) = \text{Réel}\left[2\,\frac{e^{j\Delta\phi(t)} - e^{-j\Delta\phi(t)}}{2}\,e^{j\phi(t)}\,e^{j2\pi f_0 t}\right]$$

$$e'(t) = \text{Réel}[2\cos\Delta\phi(t)\,e^{j2\pi f_0 t + \phi(t)}]$$

Thus the signal received is equal to the signal to be transmitted.

The choice of a coding may advantageously reduce the pass band needed for the transmitters 2 to the minimum.

The signals coming from N sources of signals 8 are multiplexed in time and/or transmitted in parallel.

In one alternative embodiment of the device according to the present invention, a known law of modulation is used for each transmitter. For example, laws of binary modulation are used. Advantageously, the MSK (minimum shift keying) modulation is used for all the transmitters 2. In other embodiments, the CPFSK (continuous phase frequency shift keying) or FSK (frequency shift keying) modulation is used.

Advantageously, the transcoding device 91 is connected in parallel to two over-sampling devices 92. The over-sampling device 92 over-samples the signal, for example, in a ratio of 4, 6 or 8.

Advantageously, the over-sampling device 92 is connected to a signal-smoothing device 93. Between two data transmitted, the signal-smoothing device reduces signal jumps and thus reduces the pass-band needed for the transmissions. The smoothing of the signal in the device 93 has the disadvantage of reducing the intervals of time during which the data transmitted is stable, and this results in a loss of signal at reception.

Advantageously the smoothing device is connected to a device 94 for putting the signal on a carrier wave in digital form. The outputs of the device 94 for putting the signal on a carrier wave in digital form are connected to the transmitters 2 (not shown in FIG. 6).

Figure 7:
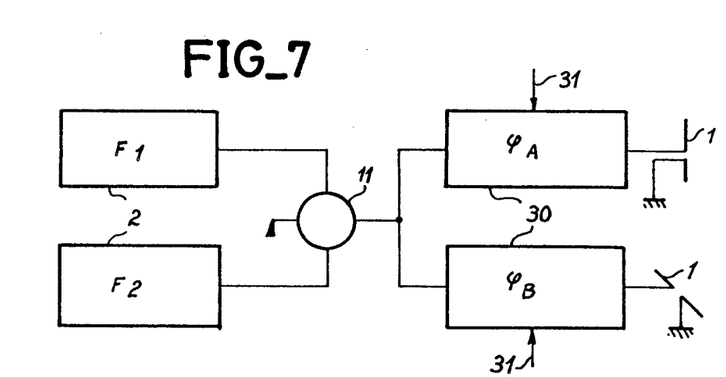
FIG. 7 is a third example of a transmitting device according to the present invention.

FIG. 7 shows an alternative embodiment of the device according to the present invention comprising two transmitters 2 capable of transmitting on two different frequencies f1 and f2. The use of two different frequencies f1 and f2 makes it possible to use the beat properties between frequencies, for example the fact that transitions through zero are done in a stationary way at fixed moments depending on the frequency ratio f1/f2.

The transmitters 2 are connected by an adding device 11. The adding device is, for example, a hybrid ring junction. The output of the adding device 11 is connected to the inputs of two phase modulators 30. The two phase modulators 30 are capable of modulating, for example in a single sideband, the signal received. The phase modulation is obtained from a signal 31 received, for example, from a processing device 9 (not shown in FIG. 7).

The signals that are phase-modulated by the phase modulator 30 are connected either directly or through amplifiers with two aerials 1 capable of working in cross polarization.

Figure 8:
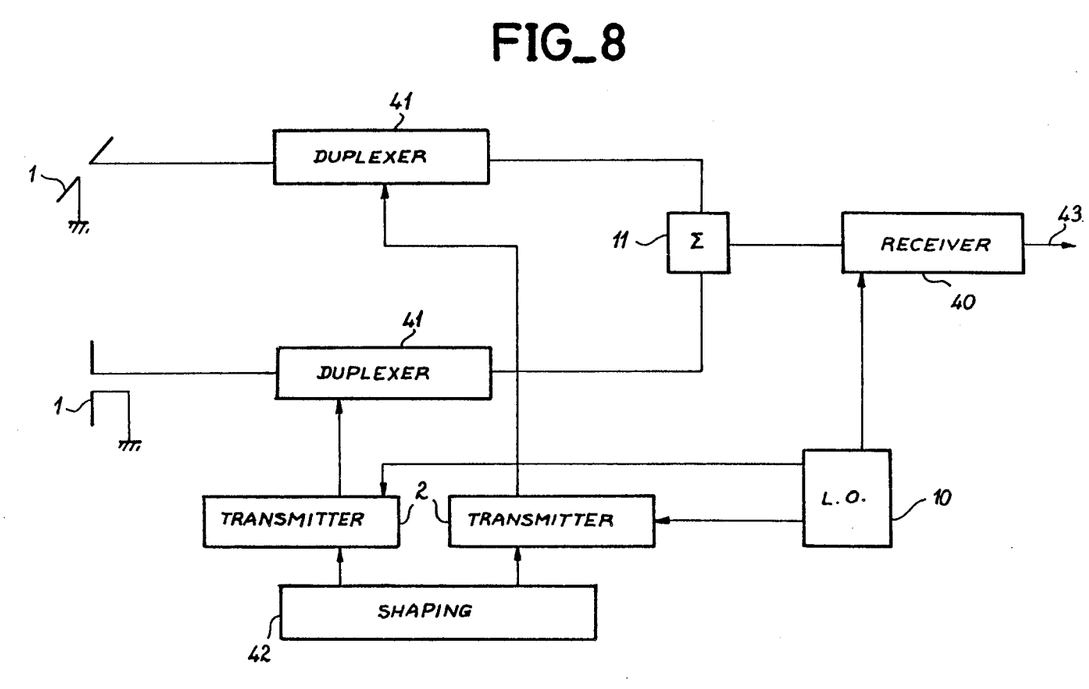
FIG. 8 is a diagram of a radar of an example of a radar according to the present invention.

FIG. 8 shows a radar device according to the present invention. The radar device has a pulse-shaping device 42. The pulse-shaping device 42 is connected to at least two transmitters 2. Furthermore, the transmitters 2 receive the signals coming from a local oscillator 10.

In one alternative embodiment (not shown) of the device according to the invention, several local oscillators are used. However, it is imperative that the signals should be coherent for the entire data-processing chain, both at transmission and at reception.

The output of each transmitter 2 is connected to the input of a duplexer 41. The output of each duplexer 41 is connected, firstly, to a transmission reception aerial 1 and, secondly, to one of the inputs of an adding device 11. The output of the adding device 11 is connected to the input of a receiver 40. Furthermore, the receiver 40 is connected to the local oscillator 10.

The shaping circuit 42 enables an extremely elaborate coding of the pulses through the use of two aerials 1 working in orthogonal polarizations. Furthermore, it is possible to use the radiation transmitted by the radar for data transmission.

Figure 9:
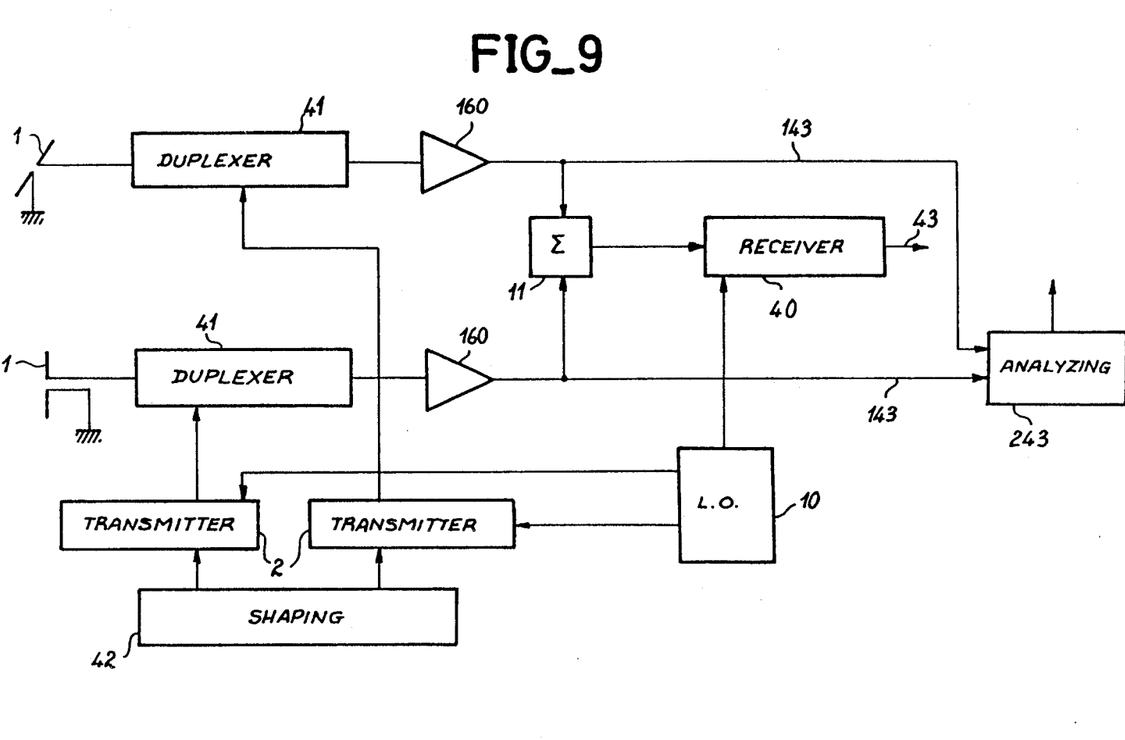
FIG. 9 is a diagram of a second example of a radar according to the present invention.

FIG. 9 shows an especially efficient radar according to the present invention. In the device of FIG. 9, the outputs of the duplexer 41 are connected to the inputs of the adding device 11 through amplifiers 160. Thus all the energy picked up by the aerials 1 at reception has been amplified. Thus, the signal-to-noise ratio has been improved by 3 dB. It is only the amplified energy that is subjected to adding by the adding device 11 which, in this case, reduces the energy given to it by 3 dB, but does not reduce the signal-to-noise ratio.

The signal added by the adding device 11 is sent to the receiver 40. At the output of the receiver 40, we have a signal 43 which can be given conventional radar processing.

In one alternative embodiment of the device according to the present invention, we also have signals picked up by the two aerials 1 in orthogonal polarization. Since the two signals 143 are in orthogonal polarizations, a comparison between them can be used to analyze target signatures. For targets such as aircraft have dihedrons. These dihedrons cause rotation in the polarization of the incident radiation. Through analysis of the signal levels received at each of the polarizations and by comparing them, it is therefore possible to identify a type of target and thus take the most effective measures for its destruction for example.

Figure 10:
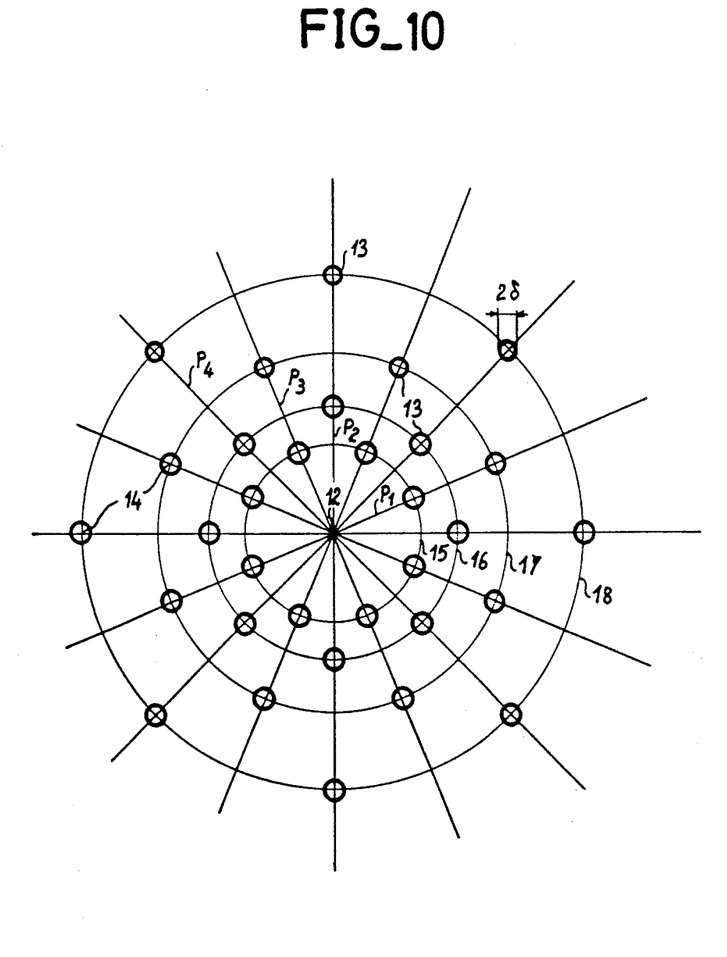
FIG. 10 is a diagram illustrating an example of digital transmission.
Figure 11:
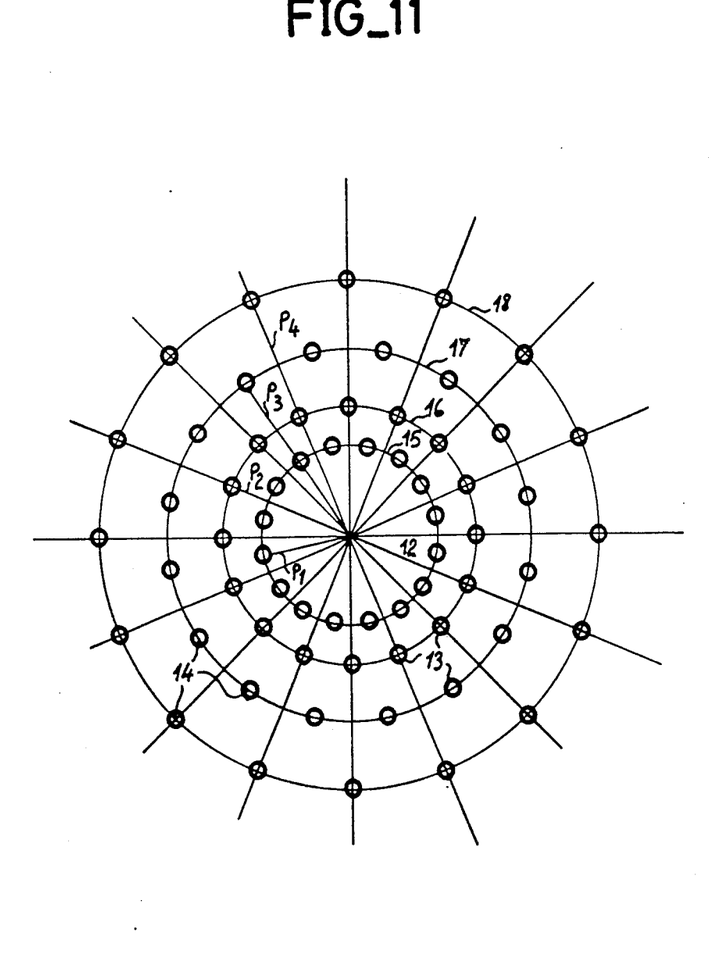
FIG. 11 is a diagram illustrating an example of digital transmission.
Figure 12:
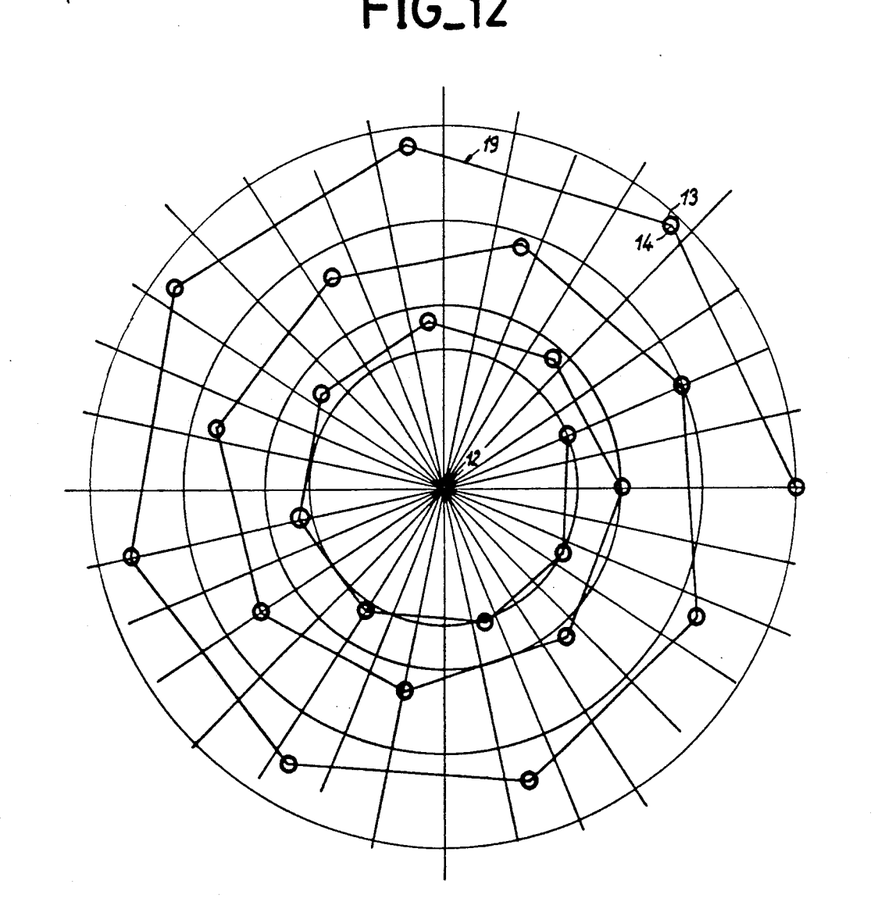
FIG. 12 is a diagram illustrating an example of digital transmission.

FIGS. 10, 11 and 12 show three examples of possible encoding of the signal according to the digital value which it is sought to transmit.

FIG. 10 shows an example of the distribution of the digital values of the signal in the complex plane obtained with two transmitters of identical power. The signal has 32 different values. This correponds to a digital transmission on 5 bits. The digital value corresponds to disks 13 of a diameter equal to $2^\delta$ distributed on four circles 15, 16, 17 and 18 with respective diameters of $\rho1$, $\rho2$, $\rho3$ and $\rho4$. $\rho1$ is equal for example to $\sqrt{2}/2$, $\rho2=1$. $\rho3=\sqrt{2}$ and $\rho4=2$, the power of a transmitter being standardized at 1. The points 14 are distributed evenly on each circle.

Advantageously, to reduce the risk of error at reception, the disks 13 are kept away at a maximum distance. Thus, on each following circle, the points 14 are placed on the bisectors of the points 14 of the preceding circle. In the example shown in FIG. 9, the phase discrimination is equal to $\pi/8$ and the signal-to-noise ratio ranges between 14 and 24 decibels.

FIG. 11 shows an example of the distribution, in the complex plane, of digital values transmitted on 6 bits, i.e. having 64 distinct points 14. The points 14 are distributed on four circles marked 15 to 18 with respective diameters of $\rho1=\sqrt{2}/2$, $\rho2=1$, $\rho3=\sqrt{2}$, $\rho4=2$, the power of the transmitter 2 being standardized at 1. The phase precision needed is equal to n/16.

FIG. 12 shows a distribution, in the complex plane, of the various digital values to be transmitted, reducing the risks of confusion to the minimum. The points 14 are distributed in a spiral with a center 12, between two circles, one circle corresponding to the minimum power needed for the desired signal-to-noise ratio and one circle corresponding to the sum of the power of all the transmitters used. Advantageously, the spiral is a logarithmic spiral. FIG. 12 shows 24 distinct points 14 corresponding to a signal-to-noise ratio of 30 decibels. The spiral used was approximated by a curve 19 made by connecting the successive points 14 by straight-line segments. The invention is not limited to the transmission of numbers represented by spatial regions using polar coordinates. It is possible, or example, to transmit most significant digits on one transmission channel and the least significant digits on the other transmission channel or to use a Cartesian representation of space using two axes.

Figure 13:
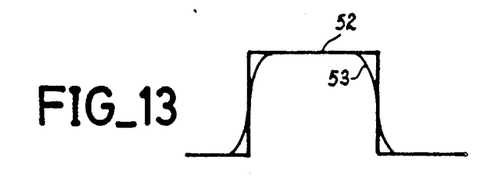
FIG. 13 is a diagram illustrating a first application of the device according to the present invention.
Figure 14:
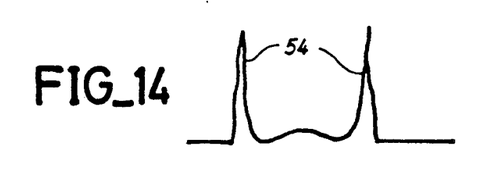
FIG. 14 is a diagram illustrating a second application of the device according to the present invention.
Figure 15:
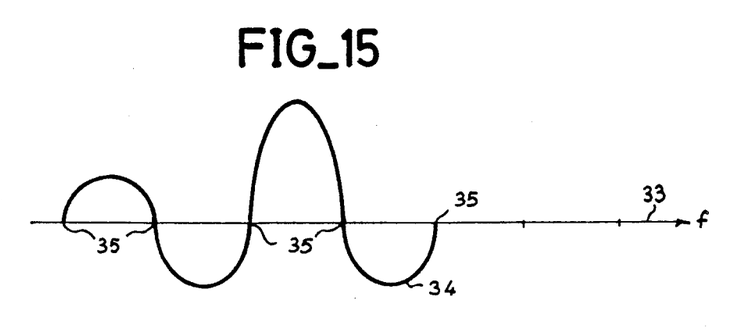
FIG. 15 is a diagram illustrating the working principle of the device of FIG. 7.

FIG. 13 shows the advantage obtained by the device of FIGS. 8 and 9. The pulse 52, normally radar transmitted, is a rectangular pulse requiring a very large pass band or causing the appearance of frequential minor lobes. The amplitude modulation made by the device according to the present invention prevents sudden transitions.

In one alternative embodiment of the device according to the present invention, comprising two transmitters 2, only the energy normally dissipated by a load at the adding device 11 is sent to the aerial presenting an orthogonal polarization. This makes it possible, firstly, to recover the energy which is usually lost and, secondly, to obtain an echo of the target corresponding to a characteristic form of the signal comprising two peaks 54 shown in figure 14.

In the examples shown, two rectilinear polarizations have been used, for example, the horizontal polarization and the vertical polarizations. The use of other types of polarization such as, for example, the circular polarization does not go beyond the scope of the present invention. For example, the left-hand circular polarization and the right-hand circular polarization are used.

Figure 16:
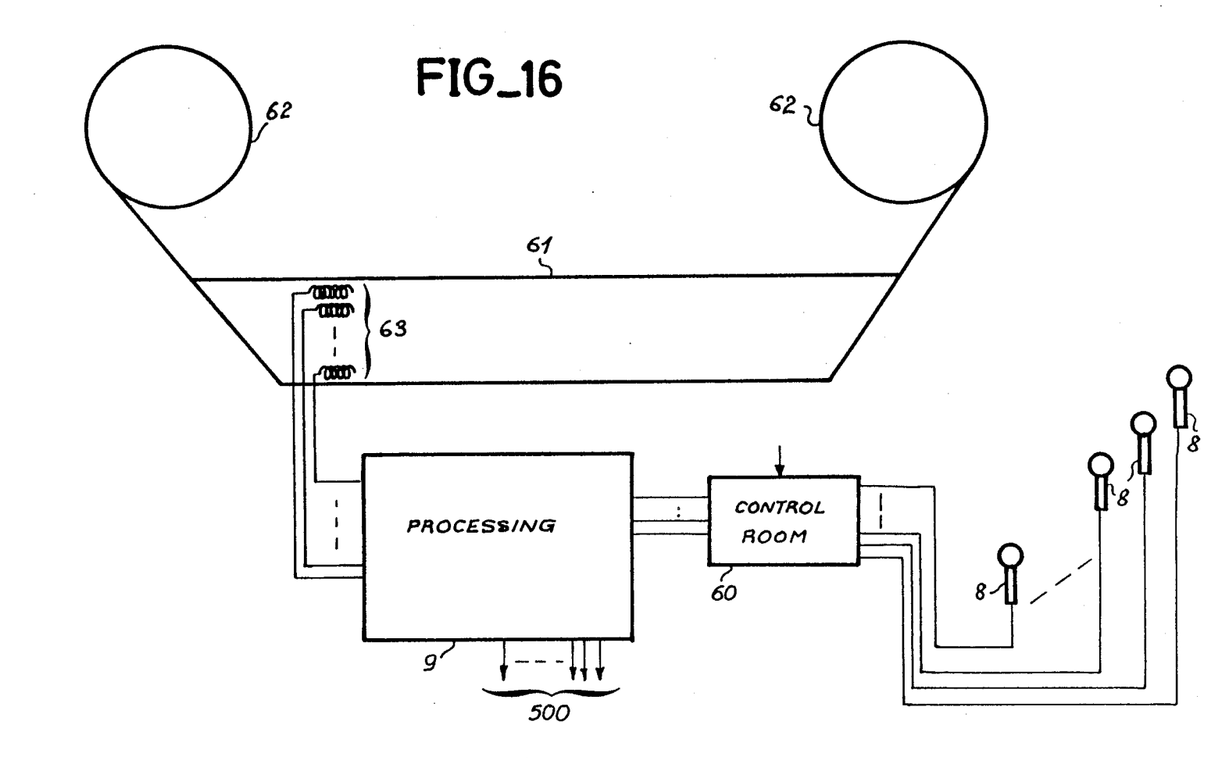
FIG. 16 is a diagram illustrating a magnetic recorder according to the present invention.

FIG. 16 shows a magnetic recorder according to the present invention. The device has at least one signal source 8. In the example shown in FIG. 16, the signal sources 8 are microphones. It is clearly understood that the use of other signal sources such as, for example, video cameras, measuring instruments or computers is not beyond the scope of the present invention. The signal sources are connected to the processing device 9. The processing device 9 is similar to the processing device of the FIGS. 2, 3 or 6. The processing device 9 is connected to several magnetic heads 63. The number of heads 63 depends, in particular, on the width of the magnetic tape 61 used. On a standard cassette recorder it is possible to use two, four or eight heads 63, for example. The number of channels of the processing device 9 is equal to the number of tracks used. The magnetic heads 63 can be applied to a magnetic head 61 that runs, for example, between two coils 62. In one alternative embodiment, the device according to the present invention has a control unit 60 connected between the signal sources 8 and the processing device 9. This control unit provides for modifying the signal before it is recorded. When the signal is recorded, the processing device performs a phase modulation of at least two read heads 63. Thus, the signal is recorded on several magnetic tracks in phase modulalation.

When reading, the processing device 9 reconstitutes the signal or signals 500 that may be used. The use may entail, for example, an amplification followed by a hearing with the use of a loudspeaker (not shown in FIG. 16).

It is possible that, at reception, there is a cross modulation of the vertical polarization by the horizontal polarization and vice versa.

Advantageously, the device of the present invention has a neutralization system used to compensate for the intermodulation of cross polarizations.

To compensate for distortions in propagation, two orthogonal codes are transmitted to the aerials 1, for example one code by the aerial transmitting a vertical polarization and one code b by the aerial transmitting in horizontal polarization. It is sought, at reception, to receive a signal proportional to a at the vertical-polarized aerial a" and a signal b" proportional to b at the horizontal-polarized aerial. In fact, a signal of the following shape is received:

$$a' = \alpha a + \beta b$$

$$b' = \gamma a + \delta b \qquad (1)$$

where ($\alpha$, $\beta$, $\gamma$, $\delta$) define the propagation matrix (unknown). To correct this fault, an octopole (i.e. having eight inputs and/or outputs) for example, will be introduced. The said octopole will perform a linear conversion on the signals a' and b' so as to recover signals proportional to a and b.

This octopole is defined by two parameters K and K' such that:

$$a'' = a' + Kb'a'$$

$$b'' = b' = K'a' \qquad (2)$$

with the condition:

$$a'' = qa$$

$$b'' = q'b \qquad (3)$$

Thus from (2) we derive:

$$a' + Kb' = qa$$

$$b' + K'a' = q'b$$

In view of the expression (1) of a' and b', this gives the following conditions bearing on the parameters (K, K') of the octopole:

$$\beta + K = 0$$

$$\gamma + K' = 0$$

The problem is that the propagation matrix is not known ($\alpha$, $\beta$, $\gamma$, $\delta$).

To determine the matrix (3), two orthogonal codes are emitted by the two aerials 1 and the covariance, namely the mean product $\overline{a''b''^*}$, is measured (x signifies the mean value of x and x* is the conjugate of x). The cancellation of the covariance $\overline{a'b'^*} = 0$, a and b being orthogonal, gives:

$$(\alpha + K\gamma)(\gamma^* + K'^*\alpha^*) = 0$$

$$(\beta + K\delta)(\delta^* + K'^*\beta^*) = 0$$

Consequently:

$$\beta + K\delta = 0$$

$$\gamma + K'\alpha = 0 \qquad (5)$$

It is precisely the conditions (3) that we were seeking. Furthermore, another solution is found:

$$\alpha + K\gamma = 0$$

$$\delta + K'\beta = 0 \qquad (6)$$

In this case, it is b' that is proportional to a and a' to b.

There is permutation only among the outputs. It suffices, therefore, to tie the parameters (K, K') of the octopole to the condition of cancellation of the covariance of the output signals to recover the signals sought.

Figure 17:
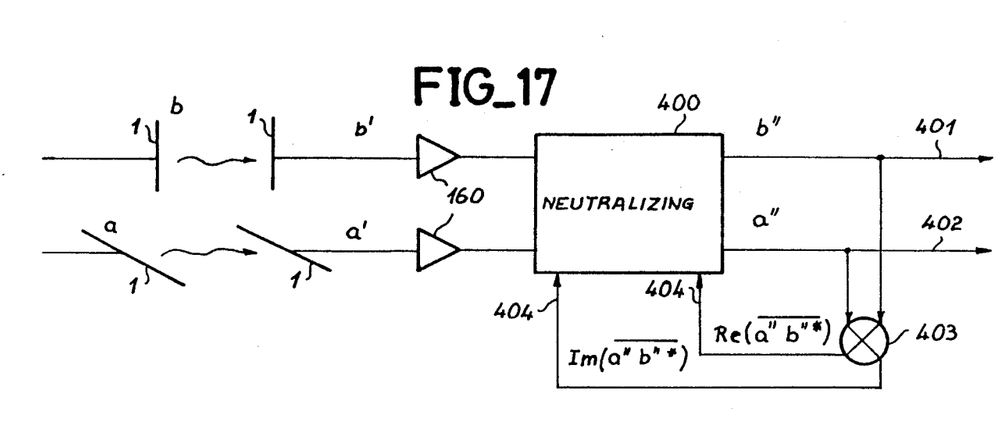
FIG. 17 is a diagram of an alternative embodiment of the device according to the present invention.

FIG. 17 shows an example of an embodiment of a device according to the invention making it possible to do away with the intermodulation between the two polarizations.

The neutralizing device 400 is connected to the reception aerials 1, advantageously by means of aerial amplifiers 160. The outputs 401 and 402 of the neutralizing device 400 are connected firstly to the subsequent processing device such as, for example, the adding device 11, not shown in FIG. 17, and secondly, to the inputs of a coherent demodulation device 403 comprising an integrating circuit. The device 403 is connected to a local oscillator (not shown). At the output of the device 403, there are the signals 404 that control the neutralizing device 400.

At a first control input of the neutralizing device 400, the real part of a"b"* is applied. At a second control input of the neutralizing device 400, the imaginary part of a"b"* is applied.

The neutralizing can be done on the carrier, at the intermediate frequency, after a first frequency reduction or after a second frequency reduction. In the latter case, a digital filter will be advantageously used.

Figure 18:
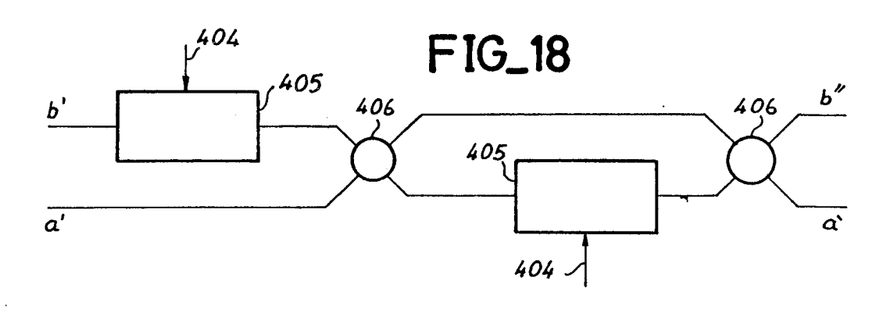
FIG. 18 is a diagram of a detail of FIG. 17.

FIG. 18 shows an embodiment similar to the neutralizing device 400 of FIG. 17.

A first line is connected to a first input of a 3 dB coupler 406 by means of a phase shifter 405. The phase shifter 405 receives a control signal 404. The 3 dB coupler is, for example, a hybrid ring junction 406.

A second line is connected to a second input of the hybrid ring junction 406.

A first output of the hybrid ring junction 406 is connected to an input of a second hybrid ring junction 406.

A second output of the hybrid ring junction 406 is connected by means of a second phase shifter 405 to a second input of the second hybrid ring junction 406. The second phase shifter 405 receives a control signal 404.

At a first output of the second hybrid ring junction 406, there is the signal b" proportional to the signal b.
At a second output of the second hybrid ring junction 406, there is the signal a' proportional the signal a.

The invention applies to the detection, transmission and storage of data using amplitude modulation, phase modulation or amplitude-phase modulation. The device according to the present invention provides for analog transmission. However, the device of the present invention is especially efficient in the transmission and storage of digital data.

The invention can be applied to the use of any known type of transmitter. However, the device and method of the present invention can be used to take advantage of the enhanced efficiency and excellent phase linearity of amplifiers working in saturated condition, namely in class C operation.

The invention applies especially to the transmission of digital data using electromagnetic waves, for example to directional radio links, television transmissions and radiophonic transmission as well as to sonar or radar detection.

What is claimed is:

1. A device for the transmission of information modulated waves comprising:
    a first transmitter connected to a first transmission aerial having a first polarization;
    a second transmitter connected to a second aerial having a second polarization which is orthogonal to the first polarization; and
    a data-processing means for determining phase angle modulation values for each of said first and second transmitters and for producing corresponding first and second modulation signals applied to respective of said first and second transmitters, said first and second transmitters in response to said first and second modulation signals independently modulating a source signal to produce respective first and second phase modulated signals, each defined by respective vectors having respective amplitude and phase components in correspondence to the determined phase angle modulation values, said phase angle modulation values being determined to enable reception, when the first and second phase modulated signals are received by a pair of aerials respectively having said first and second polarizations and the phase modulated signals so received are vector summed, of an amplitude and phase modulated data signal having a predetermined composite vector corresponding to said information.

2. A device according to the claim 1 wherein the polarizations used are rectilinear polarizations.

3. A device according to the claim 1 wherein the polarizations used are circular polarizations.

4. A device according to the claim 1 wherein the said device is a device for the transmission of digital signals by electromagnetic wave modulation.

5. A device according to the claim 1 wherein the said device is a device for the transmission of modulated waves by an acoustic signal.

6. A device according to the claim 1 wherein the said device is a directional radio link telecommunications transmitter.

7. A device according to the claim 1 wherein the said device is a television transmitter.

8. A device according to the claim 1 wherein the said device is a radar.

9. A device according to the claim 1 wherein the data-processing device contains, for each transmitter, a signal smoothing device that eliminates discontinuities in the signal due to the modulation.

10. A device according to the claim 1 comprising at least two transmitters capable of generating a signal with different carrier frequencies.

* * * * *